US010090698B2

(12) United States Patent
Melin

(10) Patent No.: US 10,090,698 B2
(45) Date of Patent: Oct. 2, 2018

(54) BATTERY MODULE AND METHOD PERFORMED THEREIN

(71) Applicant: INCELL INTERNATIONAL AB, Kista (SE)

(72) Inventor: Mats Melin, Kista (SE)

(73) Assignee: INCELL INTERNATIONAL AB, Kista (SE)

( * ) Notice: Subject to any disclaimer, the term of this patent is extended or adjusted under 35 U.S.C. 154(b) by 0 days.

(21) Appl. No.: 15/561,519

(22) PCT Filed: Jun. 9, 2016

(86) PCT No.: PCT/EP2016/063144
§ 371 (c)(1),
(2) Date: Sep. 25, 2017

(87) PCT Pub. No.: WO2017/211418
PCT Pub. Date: Dec. 14, 2017

(65) Prior Publication Data
US 2018/0191172 A1 Jul. 5, 2018

(51) Int. Cl.
*H04M 1/00* (2006.01)
*H04B 1/38* (2015.01)
*H02J 7/00* (2006.01)
*H01M 10/0525* (2010.01)
*H01M 10/44* (2006.01)
(Continued)

(52) U.S. Cl.
CPC ......... *H02J 7/008* (2013.01); *H01M 10/0525* (2013.01); *H01M 10/44* (2013.01); *H01M 10/441* (2013.01); *H01M 10/443* (2013.01); *H02J 7/0021* (2013.01); *H02J 7/0045* (2013.01); *H01M 2220/10* (2013.01); *H02M 3/156* (2013.01); *H04W 88/08* (2013.01)

(58) Field of Classification Search
CPC .................................. H02J 7/008; H02M 3/18
USPC ........................................... 455/573; 320/107
See application file for complete search history.

(56) References Cited

U.S. PATENT DOCUMENTS

2005/0121979 A1\* 6/2005 Matsumoto ......... H01M 10/441
307/66
2005/0162131 A1 7/2005 Sennami et al.
(Continued)

OTHER PUBLICATIONS

International Search Report and Written Opinion dated Feb. 10, 2017 for PCT Application No. PCT/EP2016/063144.

*Primary Examiner* — Simon Nguyen
(74) *Attorney, Agent, or Firm* — Moser Taboada

(57) ABSTRACT

A battery module comprises charging for connecting the battery module to a power source, a battery cell arrangement, and a DC-to-DC converter. A first terminal of the battery cell arrangement is connected to a first charging terminal. An input terminal of the converter is connected to the second terminal of the battery cell arrangement and another input terminal of the converter is connected to the second charging terminal. An output terminal of the converter is connected to the first terminal of the battery cell arrangement. The converter converts an input voltage (U3) received at its input terminals to an output voltage (U2) at the output terminal of the converter. The output voltage is higher than the input voltage. The battery module may for example be employed as a backup power source in a mobile communication base station. A switch arrangement may for example allow the converter to be bypassed.

20 Claims, 6 Drawing Sheets

(51) Int. Cl.
 *H04W 88/08* (2009.01)
 *H02M 3/156* (2006.01)

(56) References Cited

U.S. PATENT DOCUMENTS

| | | |
|---|---|---|
| 2006/0006850 A1 | 1/2006 | Inoue et al. |
| 2009/0096422 A1 | 4/2009 | Trattler |
| 2010/0091530 A1* | 4/2010 | Yoshida ................. H02M 1/36 363/49 |
| 2010/0188051 A1* | 7/2010 | Yamazaki ............. H02J 7/0072 320/148 |
| 2010/0246218 A1 | 9/2010 | Decraemer |
| 2010/0289452 A1* | 11/2010 | Wagatsuma ............. B60K 6/28 320/109 |
| 2011/0304299 A1* | 12/2011 | Yang ....................... H02J 7/045 320/107 |
| 2012/0105008 A1* | 5/2012 | Lipcsei ................. H02J 7/0031 320/134 |
| 2012/0313572 A1* | 12/2012 | Sheu ................... H02M 3/1582 320/107 |
| 2014/0009106 A1* | 1/2014 | Andrea ................. H02H 9/002 320/107 |
| 2015/0333634 A1* | 11/2015 | Yoshida ............ H02M 3/33576 363/21.03 |
| 2016/0118830 A1* | 4/2016 | Jeon ................... B60L 11/1866 320/127 |

* cited by examiner

BATTERY MODULE AND METHOD PERFORMED THEREIN

TECHNICAL FIELD

The present disclosure generally relates to batteries.

BACKGROUND

Rechargeable batteries are employed in different settings, for example in electric cars, in handheld devices such as mobile phones, or as backup power sources in stationary devices such as mobile communication base stations. In many cases, it is desirable to charge the batteries both quickly and efficiently when a main power supply is available, such as line power (or mains power). However, during charging, batteries may be vulnerable to high charge currents and/or high temperatures. High temperatures and/or high charge currents may cause unwanted chemical reactions in the battery which may damage the battery and/or may cause the performance of the battery to deteriorate. In batteries comprising multiple battery cells, it may be important to monitor and control the distribution of the charge current amongst the cells so as to avoid imbalance between the cells, which may otherwise cause the performance of the battery to degrade, and/or cells in the battery to be damaged. In addition to maintaining battery performance, such monitoring and control may be important to ensure safe operation of the battery during charging and/or discharging, as batteries may contain materials or substances which may cause dangerous chemical reactions if the battery is not used properly.

Although many different types of batteries and battery modules have been proposed, it would be advantageous to provide new battery modules for addressing at least one of the issues described above.

SUMMARY

To better address at least one of the abovementioned issues, battery modules and associated methods having the features defined in the independent claims are provided. Preferable embodiments are defined in the dependent claims.

Hence, according to a first aspect, a battery module is provided. The battery module (or battery pack) comprises first and second charging terminals for connecting the battery module to a power source, a battery cell arrangement having first and second terminals, and a direct current to direct current (DC-to-DC) converter. The first terminal of the battery cell arrangement is connected (or coupled) to the first charging terminal. An input terminal of the converter is connected (or coupled) to the second terminal of the battery cell arrangement. Another input terminal of the converter is connected (or coupled) to the second charging terminal. An output terminal of the converter is connected (or coupled) to the first terminal of the battery cell arrangement. The converter is adapted to convert an input voltage received at the input terminals of the converter to an output voltage at the output terminal of the converter. The output voltage is higher than the input voltage.

It will be appreciated that two terminals connected to each other may for example be directly connected to each other or indirectly connected to each other. The terminals may for example be connected to each other via one or more other components.

The converter may for example be a step up converter (also called boost converter) or a flyback converter.

The converter may be adapted to limit a charge current of the battery cell arrangement when a voltage is applied at the charging terminals. The way the converter is connected (or coupled) may allow the converter to limit a charge current between the second terminal of the battery cell arrangement and the second charging terminal when a voltage is applied at the charging terminals. A current passing between the second terminal of the battery cell arrangement and the second charging terminal may be restricted by the current allowed to pass through the input terminals of the converter.

Too high charge currents may risk damaging the battery cell arrangement and/or deteriorating its performance. Limiting the charge current helps to protect the battery cell arrangement during charging. The charge current limiting provided by the converter may for example extend the lifetime of the battery cell arrangement.

The converter may be arranged such that, during charging of the battery cell arrangement, a charge current of the battery cell arrangement corresponds to a sum of at least a current provided at (or passing between) the input terminals of the converter and a current provided at (or passing through) the output terminal of the converter. The charge current of the battery cell arrangement may for example be (or have the same value as) a sum of the current provided at the input terminals of the converter and a current provided at the output terminal of the converter.

The converter may be arranged such that, during charging of the battery cell arrangement, a voltage applied at the charging terminals is divided (or split) between at least the battery cell arrangement and the input terminals of the converter. It will be appreciated that the voltage applied at the charging terminals may for example be split between more components than the battery cell arrangement and the input terminals of the converter.

According to some embodiments, the converter may be adapted to maintain a certain power level at its input terminals for a range of levels of a voltage applied at its input terminals. In other words, even if the voltage applied at the input terminals of the converter changes (within a certain range), the converter is able to at least approximately maintain the same power level at its input terminals. The current at the input terminals of the converter is therefore controlled by the voltage applied at the input terminals of the converter.

According to some embodiments, the converter may be adapted to maintain a certain power level at its input terminals during charging of the battery cell arrangement for a range of levels of a voltage applied at the charging terminals, and for a range of levels of a voltage of the battery cell arrangement. A voltage of the battery cell arrangement may change depending on a state of charge of the battery cell arrangement. The voltage of the battery cell arrangement may for example increase during charging until a maximum voltage level is reached.

According to some embodiments, the converter may be adapted to maintain a certain level of a current at its input terminals for a range of levels of a voltage applied at its input terminals. In other words, even if the voltage applied at the input terminals of the converter changes (within a certain range), the converter is able to at least approximately maintain the same level for the current at its input terminals.

The range of input voltage levels for which the current at the input terminals of the converter is maintained at the certain level may for example be a voltage range below a voltage range of input voltages for which the converter maintains a certain power level at its input terminals.

According to some embodiments, the battery module may further comprise a switch arrangement. The switch arrangement may be operable in a first mode in which the second terminal of the battery cell arrangement is connected (or coupled) to the second charging terminal such that the converter is bypassed, and in a second mode in which the second terminal of the battery cell arrangement is disconnected from the second charging terminal. The ability of the switch arrangement to bypass the converter allows the battery cell arrangement to be charged faster and/or more efficiently in cased where there is no need for the converter (such as when the charge current does not need to be limited by the converter to protect the battery cell arrangement).

It will be appreciated that even though the second terminal of the battery cell arrangement may be disconnected from the second charging terminal in the second mode, there may still be an indirect connection between these terminals via the converter.

According to some embodiments, the battery module may further comprise a controller. If a certain condition is detected at the battery module (or at the battery cell arrangement), then the controller may control the switch arrangement to switch from the first mode to the second mode. The controller may for example be a battery management system (BMS).

The certain condition may for example include a charge current of the battery cell arrangement exceeding a threshold, and/or a temperature at the battery cell arrangement exceeding a threshold, and/or a voltage at a cell in the battery cell arrangement exceeding a threshold (e.g. an upper threshold), and/or a voltage at a cell in the battery cell arrangement being below a threshold (e.g. a lower threshold).

The certain condition may indicate that the battery cell arrangement is vulnerable to high charge currents. Switching to the second mode may then help limit the charge current so that the risk of damaging the battery cell arrangement is reduced.

That a voltage at a cell exceeds a certain threshold may for example indicate that the cell may risk getting overcharged. That a voltage at a cell is below another threshold may for example indicate that the impedance of the cell is low and that the cell is vulnerable to high charge currents.

According to some embodiments, the converter may be configured such that if a voltage applied at the input terminals of the converter is (or decreases) below a threshold, the converter controls the switch arrangement to switch from the second mode to the first mode.

If the voltage applied at the input terminal of the converter is low, this may indicate that the battery cell arrangement is at least partially charged, and that the battery cell arrangement may not be as vulnerable to large charge currents. Switching to the first mode may therefore be a way to improve efficiency of the charging.

The efficiency of the converter may decrease when the voltage applied at its input terminal decreases. Switching to the first mode (where the converter is bypassed) as soon as it is safe may therefore improve the efficiency of the charging.

According to some embodiments, the switch arrangement may be operable in a third mode for discharging the battery cell arrangement. The battery cell arrangement may for example be discharged for powering an electric circuit, device or system.

According to some embodiments, the first terminal of the battery cell arrangement may have a higher potential than the second terminal of the battery cell arrangement. In other words, the first terminal may be the plus terminal of the battery cell arrangement.

The reversed situation may also be envisaged, i.e. where the first terminal of the battery cell arrangement is the minus terminal of the battery cell arrangement and therefore has a lower potential than the second terminal of the battery cell arrangement.

According to some embodiments, the battery cell arrangement may comprise multiple battery cells. The battery cell arrangement may for example comprise battery cells of one or more types connected in series and/or in parallel.

According to some embodiments, the battery cell arrangement may comprise lithium and/or lithium ions. The battery cell arrangement may for example comprise at least one lithium (or lithium-based) battery, or at least one lithium-ion battery.

Older lead-based batteries may be less likely than lithium-based batteries to be damaged during charging. Hence, charge current limiting may be more important for lithium-based batteries.

According to some embodiments, the converter may have another output terminal which is connected to the second terminal of the battery cell arrangement. Embodiments may also be envisaged in which the converter only has one output terminal According to some embodiments, the battery module may comprise a casing (or enclosure) in which the battery cell arrangement and the converter are arranged.

According to some embodiments, the battery module may be adapted to charge the battery cell arrangement when connected, via the charging terminals, to a direct current power supply. In other words, the battery module may not need any rectifiers to transform an alternate current into a direct current.

According to some embodiments, the converter may be an integrated part of the battery module.

According to a second aspect, a wireless communication base station is provided. The base station comprises a battery module as defined in any of the embodiments of the first aspect. The base station further comprises a communication module and connectors arranged to connect the communication module to a main power source for powering the communication module. The battery module may be connected to the communication module as a backup power source.

The communication module may for example be adapted for wireless communication using one or more antennas.

The base station may for example be a base transceiver station (BTS), a Node B or an Evolved Node B (eNB).

According to some embodiments, the base station may comprise a controller configured such that if the main power source is unavailable (i.e. unavailable for powering the communication module), then the controller controls the battery cell arrangement of the battery module to discharge for powering the communication module. The controller may for example perform the control of the battery cell arrangement via a switch arrangement of the battery module. The controller may for example be a battery management system (BMS)

According to some embodiments, the base station may comprise a controller (e.g. a BMS) configured such that if the main power source is available (i.e. available for powering the communication module), then the controller controls the battery cell arrangement of the battery module to charge using the main power source. The controller may for example perform the control of the battery cell arrangement via a switch arrangement of the battery module.

The main power source may be a direct current power source or an alternate current power source. In case the main power source is an alternate current power source, the base station may for example comprise a rectifier for rectifying the alternate current such that a direct current may be provided for charging the battery module.

According to a third aspect, a method is provided. The method is performed in (or by) a battery module comprising first and second charging terminals, a battery cell arrangement and a direct current to direct current (DC-to-DC) converter. The method comprises applying a voltage at the charging terminals for charging the battery cell arrangement. The method also comprises switching to a certain mode in response to detection of a first condition at the battery module (or at the battery cell arrangement of the battery module). In the certain mode, the voltage applied at the charging terminals is divided between at least the battery cell arrangement and input terminals of the converter. In the certain mode, a charge current of the battery cell arrangement corresponds to (or has value equal to) a sum of a current provided between (or passing through) the input terminals of the converter and a current provided at (or passing through) an output terminal of the converter.

The method of the third aspect may for example be performed in (or by) a battery module as defined in any of the embodiments of the first aspect.

According to some embodiments, the first condition may for example include a charge current of the battery cell arrangement exceeding a threshold, and/or a temperature at the battery cell arrangement exceeding a threshold, and/or a voltage at a cell in the battery cell arrangement exceeding a threshold, and/or a voltage at a cell in the battery cell being below a threshold.

According to some embodiments, the method may comprise switching to another mode in response to a second condition at of the battery module. In this other mode, the converter may be bypassed.

According to some embodiments, the second condition may be that a voltage at the input terminals of the converter is (or has decreased) below a threshold.

According to some embodiments, the method may comprise discharging the battery cell arrangement for powering a communication module of a mobile communication base station, if a main power source of the mobile communication base station is unavailable.

According to some embodiments, the method may comprise charging the battery cell arrangement using a main power source of a mobile communication base station, if the main power source is available.

It is noted that embodiments of the present disclosure relate to all possible combinations of features recited in the claims. Further, it will be appreciated that the various embodiments described for the battery module, according to the first aspect, are all combinable with embodiments of the method according to the third aspect.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
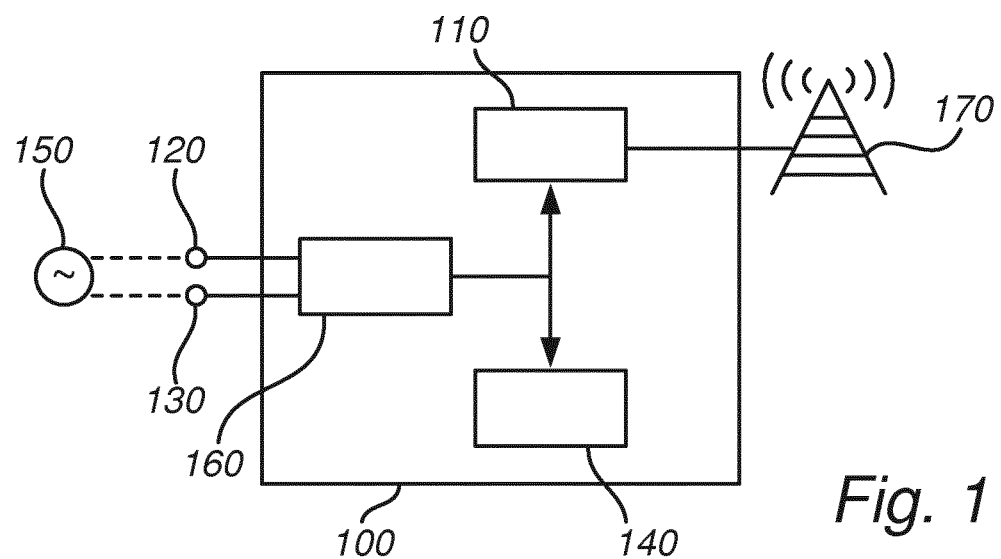
FIG. 1 is an overview of a mobile communication base station, according to an embodiment.

FIG. 1 is an overview of a mobile communication base station 100, according to an embodiment. The base station 100 may for example be a base transceiver station (BTS), a Node B or an Evolved Node B (eNB).

The base station 100 comprises a communication module 110, connectors 120 and 130, and a battery module 140 (or battery pack, or battery circuit). The connectors 120 and 130 are arranged to connect the communication module 110 to a main power source 150 for powering the communication module 110. The main power source 150 may for example be an alternate current power source such as line power (or mains power), or a direct current power source such as one or more solar panels. If the main power source 150 is an alternate current power source, the base station 100 may for example comprise one or more rectifiers 160 for providing direct current to the communication module 110 and/or the battery module 140.

The communication module 110 is adapted to perform wireless communication via one or more antennas 170. The wireless communication may for example be performed via signals in the radio frequency domain.

The battery module 140 is connected to the communication module 110 as a backup power source in case the main power source 150 is temporarily unavailable. As long as the main power source 150 is available, it may be employed to power the communication module 110 and to charge the battery module 140. If the power source becomes unavailable, for example due to a general power failure in the area or due to a local malfunction, the battery module 140 is employed to power the communication module 110. The battery module 140 may be employed as a power source until it has been discharged or until the main power source 150 becomes available again.

Figure 2:
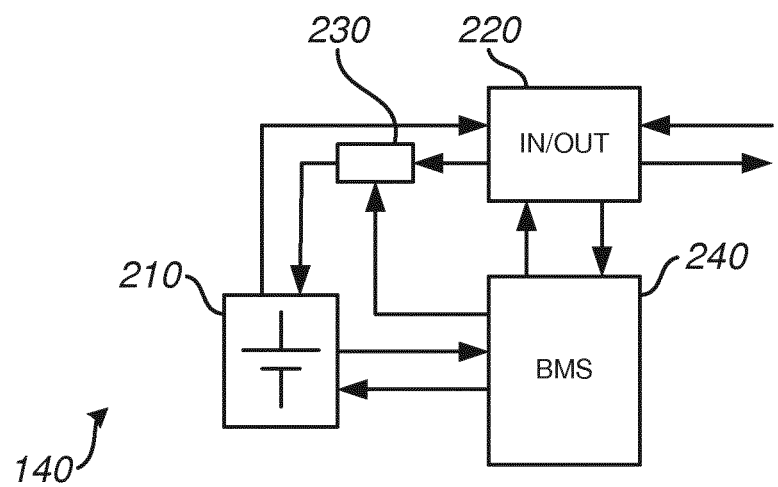
FIG. 2 is an overview of a battery module for use in the base station shown in FIG. 1, according to an embodiment.

FIG. 2 is an overview of the battery module 140. A battery cell arrangement 210 (or battery) is arranged to store power. An input/output section 220 provides input power to the battery module 140 during charging of the battery cell arrangement 210, and provides output power from the battery module 140 during discharging of the battery cell arrangement 210. A charge current limiter 230 is arranged to limit a charge current when charging the battery cell arrangement 210.

A battery management system (BMS) 240 monitors the battery cell arrangement 210 (and/or other parts of the battery module 140). The BMS 240 may for example monitor a charge current or temperature of the battery cell arrangement 210, or voltages at the battery cells in the battery cell arrangement 210. The BMS 240 controls the input/output section 220 and the charge current limiter 230 such that the battery cell arrangement 210 is charged or discharged appropriately. If an imbalance between battery cells is detected during charging, the BMS 240 may try to even out this imbalance, limit a charge current by activating the charge current limiter 230 (as described below with reference to FIGS. 5-6) or even discontinue charging of the battery cell arrangement 210 to protect the battery cell arrangement 210. Rather than discontinuing the charging altogether when an undesirable condition is detected, it may be advantageous to be able to continue the charging in a charge current limited mode so as to be able to obtain a fully charged battery cell arrangement 210. The BMS 240 will be further described below with reference to FIG. 10.

Figure 3:
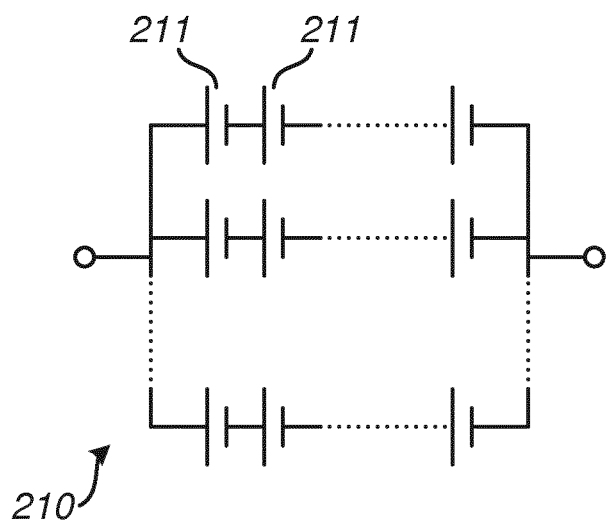
FIG. 3 shows a battery cell arrangement in the battery module shown in FIG. 2.

As shown in FIG. 3, the battery cell arrangement 210 may comprise a plurality of battery cells 211 connected (or coupled) in series and/or in parallel to obtain a desired output voltage, a desired output current capacity, and/or a desired energy storage capacity. Embodiments may also be envisaged in which the battery cell arrangement 210 comprises a single cell 211.

Figure 4:
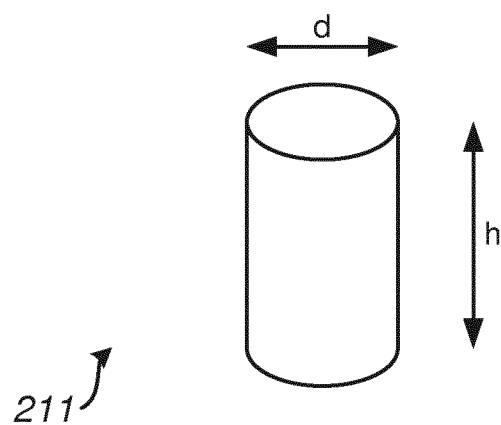
FIG. 4 shows a battery cell in the battery cell arrangement shown in FIG. 3.

As shown in FIG. 4, a battery cell 211 may for example be a cylindrical cell with height h and diameter d. The individual cells 211 may be stacked to form a single battery cell arrangement 210 which may for example be rectangular. Embodiments may also be envisaged in which the battery cells 211 have different shapes than cylindrical, such as a rectangular shape.

The battery cells 211 may for example comprise lithium or lithium-ions. The battery cells 211 may for example be Lithium cells, but other battery technologies are also possible.

As an example, the height h of a battery cell 211 may be 65 mm, the diameter d may be 18 mm. The voltage of a cell 211 may for example be in the range 2.2 V-3.7 V.

As an example, the battery cell arrangement 210 may include P strings of cells 211 connected in parallel, each string comprising S cells 211 connected in series. The integer P may be chosen to provide a suitable output voltage of the battery cell arrangement 210. The integer S may be chosen such that the battery cell arrangement 210 is able to provide a suitable output current.

Operation of the battery module 140 will now be described in more detail with reference to FIGS. 5-6.

Figure 5:
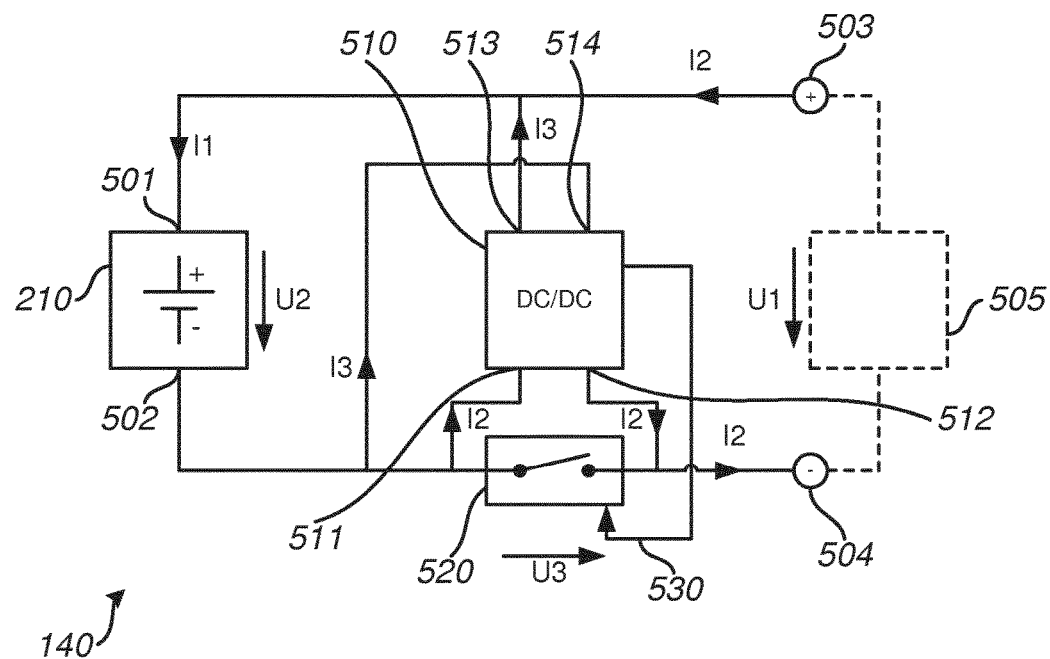
FIG. 5 shows a battery module in a state where a DC-to-DC converter is activated to limit a charge current, according to an embodiment.

FIG. 5 shows the battery module 140 in a state where the battery cell arrangement 210 (henceforth referred to simply as a battery) is being charged. The battery 210 has a first terminal 501 (the plus-terminal of the battery 210) and a second terminal 502 (the minus-terminal of the battery 210). The battery module 140 comprises first and second charging terminals 503 and 504 for connecting the battery module 140 to a power source 505.

In the present example, the power source 505 is the main power source 150 powering the base station 100, described with reference to FIG. 1. If the main power source 150 is an alternative current power source, the rectifier 160, described with reference to FIG. 1, may provide a direct current to the charging terminals 503 and 504 of the battery module 140.

The battery module 140 further comprises a direct current to direct current power converter (DC-to-DC power converter) 510 having two input terminals 511 and 512 and two output terminals 513 and 514. The DC-to-DC converter is arranged to convert (or step up) a voltage U3 applied at its input terminals 511 and 512 to a higher voltage U2 at its output terminals 513 and 514. The DC-to-DC converter 510 may for example be a step up converter 510 (also called boost converter) or a flyback converter. The DC-to-DC converter 510 may for example be a switched-mode power supply (SMPS).

The first terminal 501 of the battery 210 is connected to the first charging terminal 503. An input terminal 511 of the converter 510 (i.e. the input terminal 511 trough which current is to enter the input/supply side of the converter 510) is connected to the second terminal 502 of the battery 210 and the other input terminal 512 of the converter 510 (i.e. the input terminal 512 though which current is to exit the input/supply side of the converter 510) is connected to the second charging terminal 504. An output terminal 513 of the converter 510 (i.e. the terminal 513 through which current is to exit the output/load side of the converter 510) is connected to the first terminal 501 of the battery 210 and the other output terminal 514 of the converter 510 (i.e. the terminal 514 through which current is to enter the output/load side of the converter) is connected to the second terminal 502 of the battery 210.

The purpose of the converter 510 is to limit a charge current I1 of the battery cell arrangement 210. In other words, the converter 510 acts as the charge current limiter 230 described with reference to FIG. 2.

By arranging the converter 510 in this way, a voltage U1 applied at the charging terminals 503 and 504 is divided between the battery 210 and the input terminals 511 and 512 of the converter 510. Further, the charge current I1 of the battery 210 corresponds to a sum of a current I2 provided at the input terminals 511 and 512 of the converter 510 and a current I3 provided at the output terminals 513 and 514 of the converter 510.

The ability of the converter 510 to limit the charge current I1 will be described below in the context of a particular numerical example.

In the present example, the voltage U1 applied at the charging terminals 503 and 504 is U1=56V. When fully charged, the battery 210 also has a voltage of 56V (which would cause the voltage U3 over the input terminals 511 and 512 of the converter 510 to be 0). When the battery 210 is not fully charged, the voltage U2 over the battery may be as low as 36V, causing the voltage U3 over the input terminals 511 and 512 of the converter 510 to be 56V−36V=20V.

In the present example, the converter 510 is adapted to maintain a power level of 60 W at its input terminals 511 and 512 for a range 6V-20V of voltages U3 at its input terminals 511 and 512. This causes the current I2 at the input terminals 511 and 512 of the converter 510 to be in the range 3 A-10 A.

If, for example, the voltage U2 of the battery 210 is U2=50V, then the voltage U3 over the input terminals 511 and 512 of the converter 510 is U3=56V−50V=6V, and the current I2 at its input terminals 511 and 512 is therefore I2=60 W/6V=10 A. Due to losses in the power conversion, the converter 510 may for example only able to provide an output power of 30 W, corresponding to an efficiency of 50% for the converter 510. The current I3 at the output terminals 513 and 514 of the converter 510 is therefore I3=30 W/50V=0.6 A. Hence, the charge current I1 is I1=I2+I3=10.6 A. The battery 210 is thereby charged by a current I1=10.61 A at a voltage U1=50V, i.e. at a power of 10.6 A×50 A=530 W. Since the input power to the battery module 140 is 56V×10 A=560 W, this corresponds to an overall efficiency of 95%. In other words, the converter 510 provides charge current limiting for the battery 210 at a charge efficiency of 98%, even though the converter 510 is quite small (only 60 W at the input side) compared to the charge power (530 W), and even though the efficiency of the converter 510 itself is only 50%. Increasing the efficiency of the converter 510 above 50% would improve the charge efficiency even further.

As the battery 210 gets closer to fully charged, the voltage U2 over the battery 210 may increase and the voltage U3 over the input terminals 511 and 512 of the converter 510 may eventually drop below 6V. In the present example, the converter 510 is adapted to maintain the current I2=10 A at its input terminals 511 and 512 for a range 1V-6V of voltages U3 at its input terminals 511 and 512. Hence, the converter 510 provides current limiting also for this voltage range. If the efficiency of the converter 510 is still 50%, then the charge efficiency is maintained at 95%. Although embodiments may be envisaged in which the converter 510 is adapted to maintain the current I2=10 A at its input terminals 511 and 512 also for higher voltages U3 than 6V at its input terminals 511 and 512, this would require a converter 510 which is able to handle higher power levels than 60 W at its input terminals 511 and 512. For example, if the converter 511 were to maintain the current I2=10 A its input terminals 511 and 512 also for voltages U3 as high as 20V, the power at its input terminals 511 and 512 would be as high as 200 W.

As the battery 210 gets even closer to fully charged, the voltage U2 over the battery 210 may increase towards the charge voltage U1. When closer to fully charged, the cells 211 of the battery 210 may then be less vulnerable to high charge currents, and the charge current limiting provided via the converter 510 is not needed anymore. For example, the impedance of the cells 211 may increase as the cells 211 get closer to fully charged.

As described above, the converter 510 may not be needed when the voltage U2 over the battery 210 gets close to the charge voltage U1. When the voltage U2 over the battery 210 gets close to the charge voltage U1, the voltage U3 over the input terminals 511 and 512 of the converter 510 decreases. It may be more difficult for the converter 510 to maintain the same efficiency (e.g. 50%) for low input voltages U3. Hence, in addition to not being needed when the battery 210 is close to fully charged, the converter 510 may not be able to perform as efficiently as when the battery 210 is not as fully charged.

The battery module 140 may therefore comprise a switch arrangement 520 for bypassing the converter 510. The switch arrangement 510 is operable in a first mode in which the second terminal 502 of the battery 210 is connected to the second charging terminal 504 such that the converter 510 is bypassed, and in a second mode in which the second terminal 502 of the battery 210 is disconnected from the second charging terminal 504. The switch arrangement 520 may be activated to bypass the converter 510 if the input voltage U3 of the converter 510 drops below a threshold (such as 1V). The converter 510 may for example provide a control signal 530 for causing the switch arrangement 520 to switch to the first mode in which the converter 510 is bypassed. The switch arrangement 520 may comprise one or more switches, for example in the form of one or more transistors, such as MOSFET transistors.

The converter 510 may for example be switched off completely when it is bypassed, so as to save power.

Figure 6:
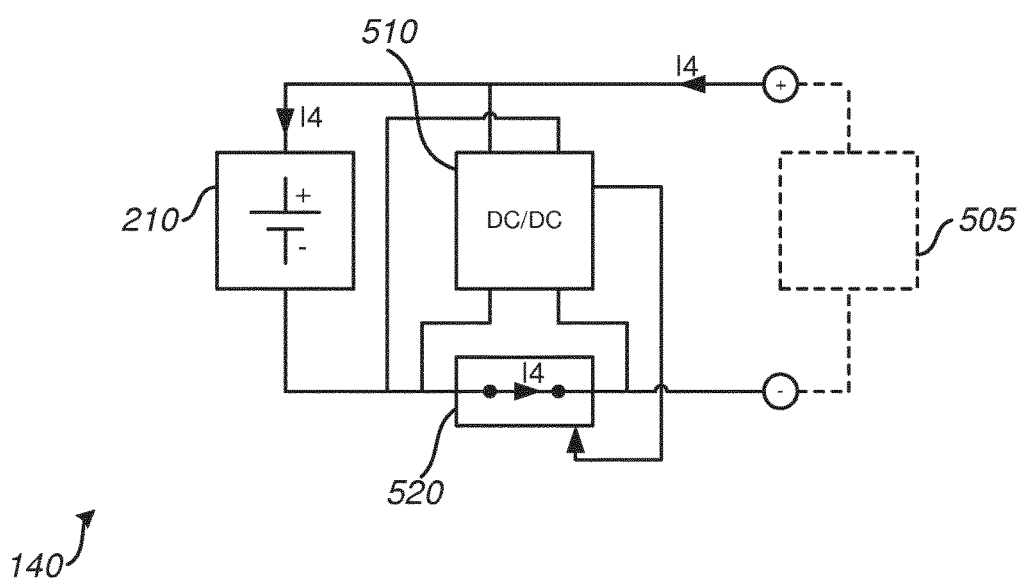
FIG. 6 shows the same battery module as in FIG. 5, but in a state where the DC-to-DC converter is bypassed, according to an embodiment.

FIG. 6 shows the battery module 140 in a state where the battery 210 is being charged without current limiting. More specifically, the switch arrangement 520 is in the first mode in which the converter 510 is bypassed, such that no voltage is applied at the input terminals 511 and 512 of the converter 510. The battery 210 is thereby provided with a charge current I4 which is not subjected to charge current limiting. Instead, the charge current I4 depends on the power source 505 and the impedance of the battery 210.

If the battery 210 is charged without current limiting, as described with reference to FIG. 6, the BMS 240 (described above with reference to FIG. 2) may monitor the battery 210 in order to detect when charge current limiting is needed. If a certain condition at the battery 210 is detected by the BMS 240, such as a too high charge current I4, a too high temperature, or certain voltage levels at the battery cells 211, the BMS 240 may control the switch arrangement 520 to switch to the second mode in which the converter 510 is activated to perform charge current limiting (as described with reference to FIG. 5).

In the numerical example provided above, a threshold for the charge current I4 may for example be 30 A. In other words, if the charge current I4 exceeds 30 A, then the switch arrangement 520 activates the converter 510 to limit the charge current by transitioning into the mode described with reference to FIG. 5.

As described above, the converter 510 is adapted to maintain a certain power level (e.g. 60 W) at its input terminals 511 and 512 for a range of levels of the voltage U3 applied at its input terminals 511 and 512 (and is also adapted to maintain a certain level for the current I2 at its input terminals 511 and 512 for another range of voltages U3). In other words, the converter 510 is able to maintain the same power level (or current I2) at its input side for a range of voltages U3 applied at the charge terminals 503 and 504, and a range of voltages U2 at the battery 210. Therefore, the converter 510 is able to provide charge current limiting for different voltages U3 applied at the charging terminals (not only for charge voltages U3=56V being equal to a maximum voltage of the battery 210, as in the specific numerical example given above). Similarly, the converter is able to provide charge current limiting for different voltages U2 at the battery 210 (i.e. for different state-of-charge of the battery 210).

If a battery is to be charged, it may be important to know which charge voltage to apply and which charge current the battery is able to handle without being damaged. Since many different voltage levels and current levels are employed on the market both for batteries and chargers, there is more or less always a risk that the wrong charger is applied to a battery, which may result in the battery being damaged. One could integrate a charge current limiter in the charger. However, the exact properties of all batteries to be charged may not be known when designing the charger (or a user may accidentally employ the charger to the wrong type of battery). Therefore, the design of such charge current limiters may be difficult. For example, it may be difficult to provide reliable charge current limiting without significantly reducing the efficiency of the charger and/or the speed by which batteries may be charged safely.

Another option would be to integrate the charge current limiter in a rectifier (such as the rectifier 160 described with reference to FIG. 1) supplying the battery with direct current during charging of the battery. However, as the exact properties of the battery to be charged may not be known when designing the rectifier, it may be difficult to provide reliable charge current limiting without significantly reducing the efficiency of the charging.

For example, if a charge current limiter would be integrated into the rectifier 160 of the base station 100, described with reference to FIG. 1, the exact properties of the particular battery module 140 to be installed into the base station 100 may be unknown when the rectifier 160 is constructed. The battery module 140 employed in the base station 100 may for example be replaced by newer versions once battery technology has advanced, and such changes may be difficult to predict when designing the rectifier 160. Integration of the charge current limiting functionality into the battery module 140 is therefore preferable.

Since the converter 510 is an integrated part of the battery module 140, the charge current limiting provided by the converter 510 may be tailored to the battery 210 by choosing a suitable DC-to-DC converter 510. For example, input voltage U3 ranges for when to maintain a certain input power and a certain input current I2, respectively, may be selected based on known (or estimated) properties of the battery 210.

It will be appreciated that the efficiency of the converter 510 may not be constant for the entire input voltage range, and that the efficiency may for example drop due to increased conversion losses as the input voltage U3 decreases towards 1V. Still, integration of a converter 510 in the battery module 140 allows for a relatively efficient charging, as compared to other means of limiting the charge current.

Figure 11:
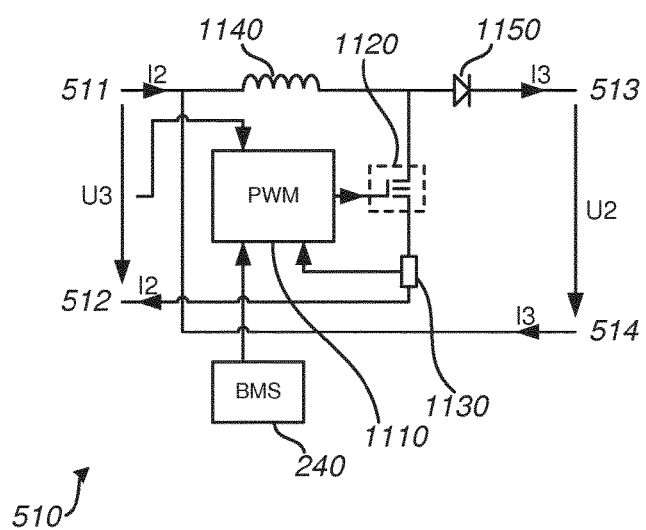
FIG. 11 shows an example DC-to-DC converter for use in the battery module shown in FIGS. 5-6.

An example DC-to-DC converter 510 will now be described with reference to FIG. 11. The converter 510 may for example employ pulse width modulation (PWM) or frequency modulation to convert the input voltage U3 and input current I2 to the output voltage U2 and output current I3. In the present example, a PWM section 1110 controls a MOSFET transistor 1120 based on the input voltage U3, the input current I2 (measured via a voltage over a resistance 1130), and based on control signals from the BMS 240.

The first input terminal 511 (i.e. the input terminal 511 through which current is to enter the converter 510) is connected to the first output terminal 513 (i.e. the output terminal 513 through which current is to exit the converter 510) via an inductor 1140 and a diode 1150. The first input terminal 511 is also directly connected to the second output terminal 514 (i.e. the output terminal 514 trough which current is to enter the converter 510).

The second input terminal 512 (i.e. the input terminal 512 through which current is to exit the converter 510) is connected via the transistor 1120 controlled by the PWM section 1110 to a connection between the inductor 1140 and the diode 1150.

The skilled person is well-aware of how to select the inductor 1140 and how to control the PWM section 1110 for providing the prescribed voltages, currents and/or power levels described above.

It will be appreciated that other DC-to-DC converters than the converter 511 described with reference to FIG. 11 may also be envisaged. It will be appreciated that more complex converter designs may be employed to increase the efficiency of the converter for at least some input voltage U3 ranges.

The battery module 140, described with reference to FIGS. 1-6, may for example comprise a casing (not shown in FIGS. 1-8) in which the battery 210 and the converter 510 are arranged. The battery module 140 may for example be mounted or inserted into the base station 100 for replacing older battery modules (such as lead-based batteries).

As described with reference to FIG. 1, the battery module 140 may be arranged as a backup power source in a base station 100. In order to provide the input/output functionality 220 described with reference to FIG. 2, the battery module 140 may comprise one or more switches (e.g. in the form of transistors, such as MOSFET transistors) for switching between a mode in which the battery module 140 is charged, and a mode in which the battery module 140 is discharged for powering the communication module 110 of the base station 100.

The charge current limiting functionality 230 provided by the converter 510 is intended to protect the battery 210 during charging. The present disclosure does not relate to limiting of discharge currents. If desired, discharge current may be limited by any suitable method known to the skilled person.

Figure 7:
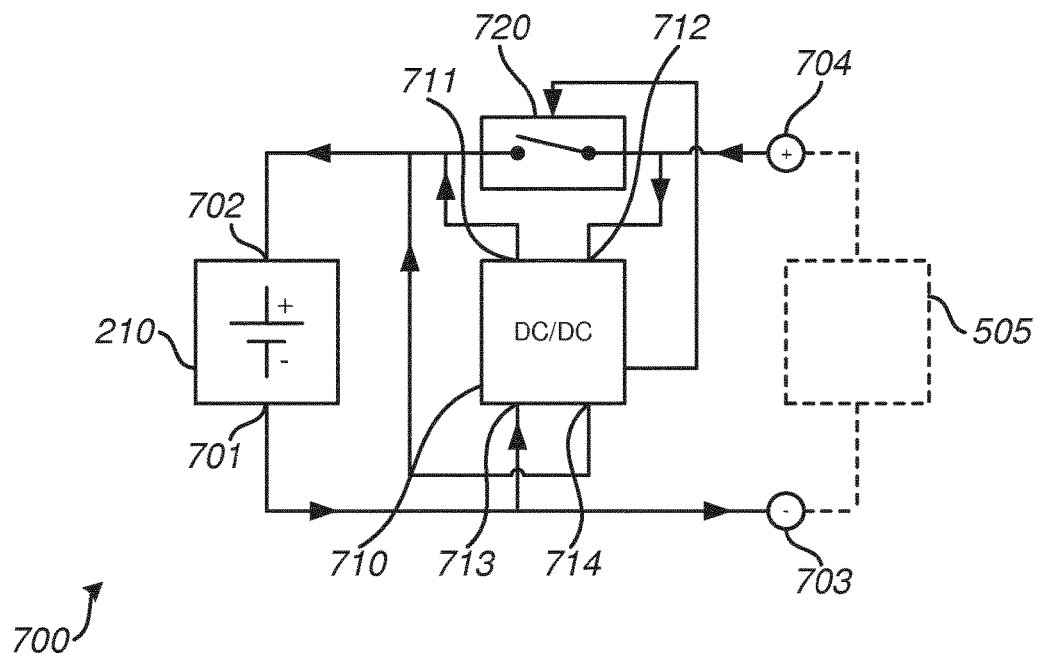
FIG. 7 shows another battery module in a state where a DC-to-DC converter is activated to limit a charge current, according to an embodiment.

In the embodiment described with reference to FIGS. 5-6, the first terminal 501 of the battery 210 is the plus terminal of the battery 210 and therefore has higher potential than the second terminal 502 of the battery. In that embodiment, the input terminals 511 and 512 of the converter 520 face the low potential side of the battery 210, which could for example be connected to ground (or earth) potential. FIG. 7 shows an alternative embodiment of the battery module 700, similar to the battery module 140 described with reference to FIGS. 5-6, but where the input terminals 711 and 712 of the converter face the low potential side of the battery 210.

The battery module 700 comprises first and second charging terminals 703 and 704 for connecting the battery module 700 to a power source 505. The battery module 700 further comprises a battery cell arrangement 210 (or simply "battery") having first and second terminals 701 and 702, and a DC-to-DC converter 710 (e.g. a step up converter) having input terminals 711 and 712 and output terminals 713 and 714.

The first terminal 701 of the battery 210 (in this case the minus terminal of the battery 210) is connected to the first charging terminal 703 (in this case the low potential charging terminal which may for example be connected to ground/earth potential). An input terminal 711 of the converter 710 is connected to the second terminal 702 of the battery 210 and the other input terminal 712 of the converter 710 is connected to the second charging terminal 704. An output terminal 713 of the converter 710 is connected to the first terminal 701 of the battery 210 and the other output terminal 714 of the converter 710 is connected to the second terminal 702 of the battery 210. Similarly to the battery module 140, described with reference to FIGS. 5-6, the battery module 700 comprises a switch arrangement 720 for bypassing the converter 710.

It will be appreciated that the battery module 700, described with reference to FIG. 7, functions similarly to the battery module 140 described with reference to FIGS. 5-6.

Figure 9:
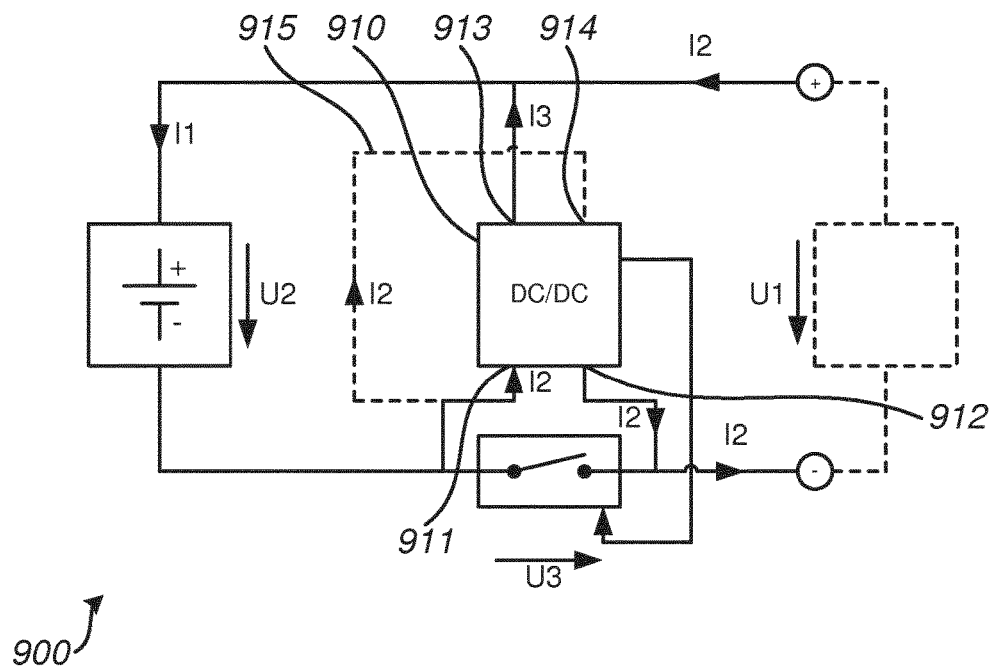
FIG. 9 shows another battery module in a state where a DC-to-DC converter is activated to limit a charge current, according to an embodiment.

The converter 510 described with reference to FIGS. 5-6 and 11 has two output terminals 513 and 514. Some DC-to-DC converters only have one output terminal. A battery module 900 comprising such a DC-to-DC converter 910 is shown in FIG. 9.

The battery module 900 is similar to the battery module 140, described with reference to FIGS. 5-6, except that one of the output terminals 913 and 914 of the converter 910 is not available from outside the converter 910. More particularly, there is an internal connection 915 in the converter 910 between an output terminal 914 (through which a current I3 would otherwise enter the converter 910) and an input terminal 911 (through which a current I2 enters the converter 910). This output terminal 914 is therefore not needed at the outside of the converter 910 for connection to other electronic components. Hence, the converter 910 only has one output terminal 913 available from the outside of the converter 913. The input terminals 911 and 912 of the converter 910, and the output terminal 913 of the converter 910, may be connected analogously as the corresponding terminals 511, 512 and 513 of the converter 510 in the battery module 140, described with reference to FIGS. 5-6. Similarly to the converter 510, described with reference to FIGS. 5-6, the converter 910 is adapted to convert a voltage U3 applied at its input terminals 911 and 912 to a voltage U2 at its output terminal 913.

Figure 10:
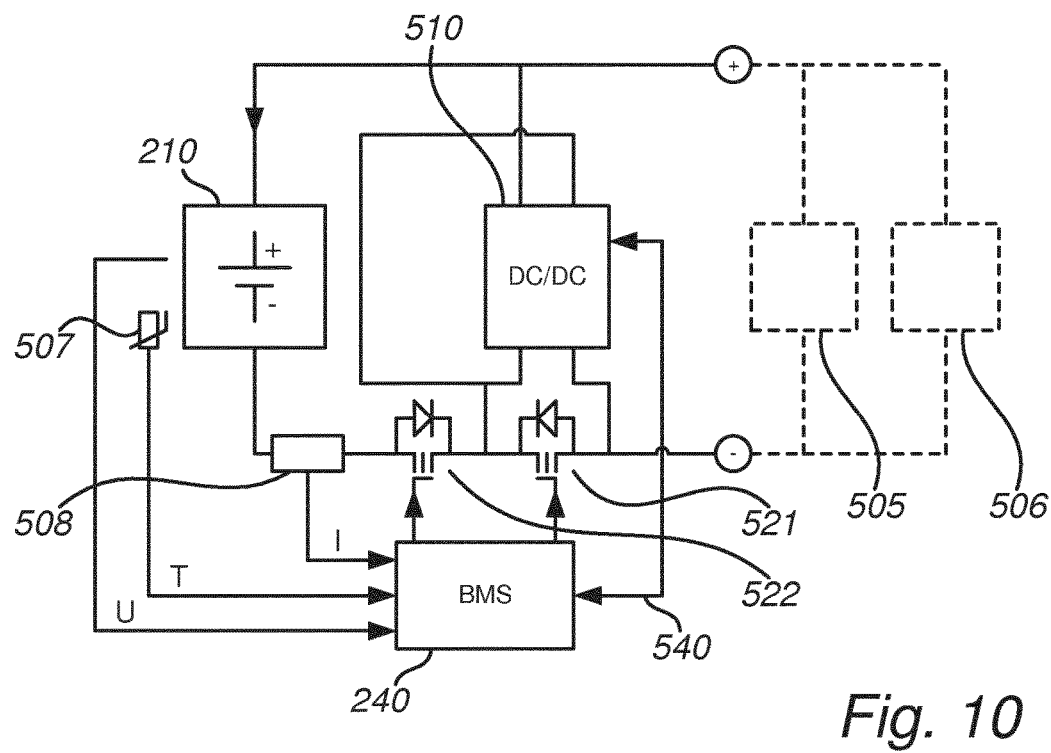
FIG. 10 shows more details of the battery module shown in FIGS. 5-6.

FIG. 10 shows more details of how the BMS 240 controls the battery module 140 described with reference to FIGS. 5-6. A load 506 is connected in parallel to the power source 505. The load 506 may for example be the communication module 110 of the base station 100, described with reference to FIG. 1. The BMS 240 controls a switch arrangement in the form of a charge switch 521 and a discharge switch 522 for charging the battery 210 when the power source 505 is available and for discharging the battery 210 for powering the load 506 when the power source 505 is unavailable. The charge and discharge switches 521 and 522 may for example be provided in the form of MOSFET transistors with diodes connected in parallel. The voltage U at the battery 210, the charge current I (e.g. obtained by measuring a voltage over a resistor 508), and/or the temperature T (e.g. measured by a temperature sensor 507) may be employed as input by the BMS 240 for controlling the switches 521 and 522. The BMS 240 may also provide control signals 540 for switching off (or deactivating) the converter 510 when it is not needed, so as to save power. The BMS 240 may receive control signals 540 from the converter 510 indicating when charge current limiting is no longer needed, so that the charge switch 521 may be controlled to bypass the converter 510.

Figure 8:
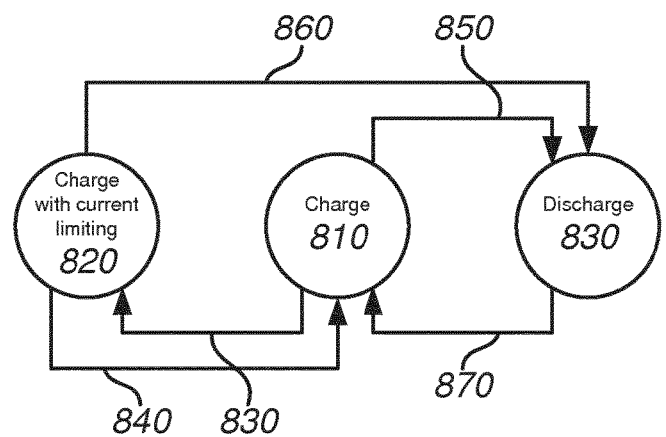
FIG. 8 shows states between which the battery modules shown in FIGS. 5-7 may transition.

FIG. 8 shows states between which the battery modules described with reference to FIGS. 5-7 may transition. Although these states will be described in terms of the battery module 140 from FIGS. 5-6, it will be appreciated that battery modules 700 and 900, described with reference to FIGS. 7 and 9, may apply the same modes.

As long as the power source 505 (or the main power source 150) is available, the battery module 140 may be in a charge mode 810 in which the battery 210 is charged. If, however, it is detected by the BMS 240 that the charge current I4 is above a threshold, the BMS 240 may control the switch 520 such that the voltage U1 is split between the converter 510 and the battery 210, thereby transitioning 830 into a charge mode with current limiting 820. If the voltage U3 over the input terminals 511 and 512 of the converter 510 drops below a threshold, the converter controls the switch 520 to open such that the converter 510 is bypassed, thereby transitioning 840 the battery module 140 into the charge mode 810 without charge current limiting.

If the battery module 140 is in the charge mode 810 and the power source 505 becomes unavailable, the battery module 140 may transition 850 into a discharge mode 830 wherein the battery 210 is discharged for powering the communication module 110, described with reference to FIG. 1. This transition 850 may for example be effected by one or more transistors (e.g. by shutting off a charge transistor and switching on a discharge transistor).

Similarly, if the battery module 140 is in the charge mode with charge current limiting 810 and the power source 505 becomes unavailable, the battery module 140 may transition 860 into a discharge mode 830. This transition 860 may also be effected by one or more transistors (e.g. by shutting off a charge transistor and switching on a discharge transistor).

If the battery module 140 is in the discharge mode 830 and the power source 505 becomes available, the battery module may transition 870 into the charge mode 810 without charge current limiting (e.g. by shutting off a discharge transistor and switching on a charge transistor).

The person skilled in the art realizes that the present invention is by no means limited to the preferred embodiments described above. On the contrary, many modifications and variations are possible within the scope of the appended claims. For example, although the battery module 140 has been described in the context of a wireless communication base station 100, it will be appreciated that the battery module 140 may be employed in more or less any device or system powered by a researchable battery, as long as voltage levels, power levels etc. of the components of the battery module 140 are selected appropriately. For example, the battery module 140 may be employed at core sites or switch sites of a telecommunication infrastructure. It will also be appreciated that the particular voltage levels, current levels and power levels described above are examples, and that embodiments of the present disclosure may be envisaged for more or less any voltage levels, power levels etc., as long as suitable DC-to-DC converters may constructed. The skilled person realizes that the circuits described with reference to FIGS. 5-7 and 9-11 may for example comprise additional components than those described. Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. The mere fact that certain measures are recited in mutually different dependent claims does not indicate that a combination of these measures cannot be used to advantage. Any reference signs in the claims should not be construed as limiting the scope.

The invention claimed is:

1. A battery module comprising:
    first and second charging terminals for connecting the battery module to a power source;
    a battery cell arrangement having first and second terminals; and
    a direct current to direct current converter,
    wherein the first terminal of the battery cell arrangement is connected to the first charging terminal, wherein an input terminal of the converter is connected to the second terminal of the battery cell arrangement and another input terminal of the converter is connected to the second charging terminal, wherein an output terminal of the converter is connected to the first terminal of the battery cell arrangement, wherein the converter is adapted to convert an input voltage received at the input terminals of the converter to an output voltage at said output terminal of the converter, and wherein the output voltage is higher than the input voltage.

2. The battery module of claim 1, wherein the converter is adapted to:

limit a charge current of the battery cell arrangement when a voltage is applied at the charging terminals;

maintain a certain power level at its input terminals for a range of levels of a voltage applied at its input terminals;

maintain a certain power level at its input terminals during charging of the battery cell arrangement for a range of levels of a voltage applied at the charging terminals, and for a range of levels of a voltage of the battery cell arrangement; and/or maintain a certain level of a current at its input terminals for a range of levels of a voltage applied at its input terminals.

3. The battery module of claim 1, wherein the converter is arranged such that, during charging of the battery cell arrangement:

a first current is provided at the input terminals of the converter, a second current is provided at said output terminal of the converter, and a charge current of the battery cell arrangement corresponds to a sum of at least the first and second currents.

4. The battery module of claim 1, wherein the converter is arranged such that, during charging of the battery cell arrangement, a voltage applied at the charging terminals is divided between at least the battery cell arrangement and the input terminals of the converter.

5. The battery module of claim 1, further comprising:

a switch arrangement operable in a first mode in which the second terminal of the battery cell arrangement is connected to the second charging terminal such that the converter is bypassed, and in a second mode in which the second terminal of the battery cell arrangement is disconnected from the second charging terminal.

6. The battery module of claim 5, further comprising:

a controller configured to control, in response to detection of a condition at the battery module, the switch arrangement to switch from the first mode to the second mode, wherein said condition includes at least one of:

a charge current of the battery cell arrangement exceeding a threshold;

a temperature at the battery cell arrangement exceeding a threshold;

a voltage at a cell in the battery cell arrangement exceeding a threshold; and a voltage at a cell in the battery cell arrangement being below a threshold.

7. The battery module of claim 5, wherein the converter is configured to control, in response to a voltage applied at the input terminals of the converter being below a threshold, the switch arrangement to switch from the second mode to the first mode.

8. The battery module of claim 5, wherein the switch arrangement is operable in a third mode for discharging the battery cell arrangement.

9. The battery module of claim 1, wherein the converter is an integrated part of the battery module.

10. The battery module of claim 1, wherein the battery cell arrangement comprises lithium or lithium ions.

11. The battery module of claim 1, wherein the converter has another output terminal which is connected to the second terminal of the battery cell arrangement.

12. The battery module of claim 1, wherein the first terminal of the battery cell arrangement has a higher potential than the second terminal of the battery cell arrangement.

13. The battery module of claim 1, wherein the battery cell arrangement comprises multiple battery cells.

14. The battery module of claim 1, further comprising a casing in which the battery cell arrangement and the converter are arranged.

15. The battery module of claim 1, adapted to charge the battery cell arrangement when connected, via the charging terminals, to a direct current power supply.

16. A wireless communication base station comprising:

a communication module;

connectors arranged to connect the communication module to a main power source for powering the communication module; and a battery module connected to the communication module as a backup power source, said battery module comprising:

first and second charging terminals for connecting the battery module to the main power source;

a battery cell arrangement having first and second terminals; and a direct current to direct current converter, wherein the first terminal of the battery cell arrangement is connected to the first charging terminal, wherein an input terminal of the converter is connected to the second terminal of the battery cell arrangement and another input terminal of the converter is connected to the second charging terminal, wherein an output terminal of the converter is connected to the first terminal of the battery cell arrangement, wherein the converter is adapted to convert an input voltage received at the input terminals of the converter to an output voltage at said output terminal of the converter, and wherein the output voltage is higher than the input voltage.

17. The wireless communication base station of claim 16, comprising a controller configured to:

cause, via control of a switch arrangement of the battery module when the main power source is unavailable, the battery cell arrangement of the battery module to discharge for powering the communication module; and/or cause, via control of a switch arrangement of the battery module when the main power source is available, the battery cell arrangement of the battery module to charge using the main power source.

18. A method performed in a battery module comprising first and second charging terminals, a battery cell arrangement having first and second terminals, and a direct current to direct current converter, wherein the first terminal of the battery cell arrangement is connected to the first charging terminal, wherein an input terminal of the converter is connected to the second terminal of the battery cell arrangement and another input terminal of the converter is connected to the second charging terminal, wherein an output terminal of the converter is connected to the first terminal of the battery cell arrangement, wherein the converter is adapted to convert an input voltage received at the input terminals of the converter to an output voltage at said output terminal of the converter, and wherein the output voltage is higher than the input voltage, the method comprising:

applying a voltage at the charging terminals for charging the battery cell arrangement;

in response to detection of a first condition at the battery module, switching to a mode in which the second terminal of the battery cell arrangement is disconnected from the second charging terminal such that the voltage applied at the charging terminals is divided between at least the battery cell arrangement and the input terminals of the converter, and such that a charge current of the battery cell arrangement corresponds to a sum of a current provided between the input terminals of the converter and a current provided at said output terminal of the converter.

19. The method of claim 18, wherein the first condition includes at least one of:
   a charge current of the battery cell arrangement exceeding a threshold;
   a temperature at the battery cell arrangement exceeding a threshold;
   a voltage at a cell in the battery cell arrangement exceeding a threshold; and
   a voltage at a cell in the battery cell arrangement being below a threshold.

20. The method of claim 18, further comprising:
   in response to a second condition at of the battery module, switching to a mode in which the converter is bypassed.

* * * * *